Patented July 27, 1937

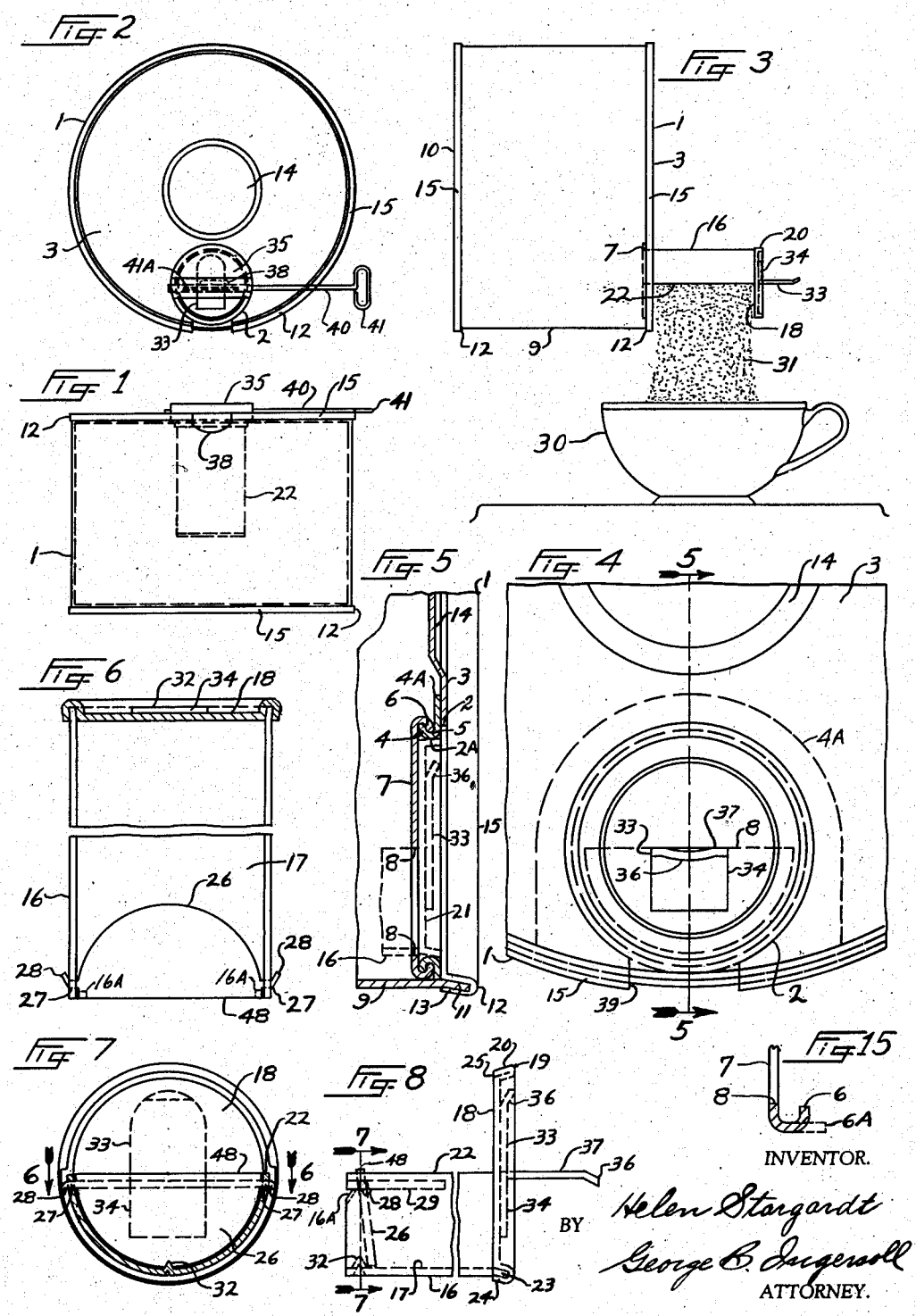

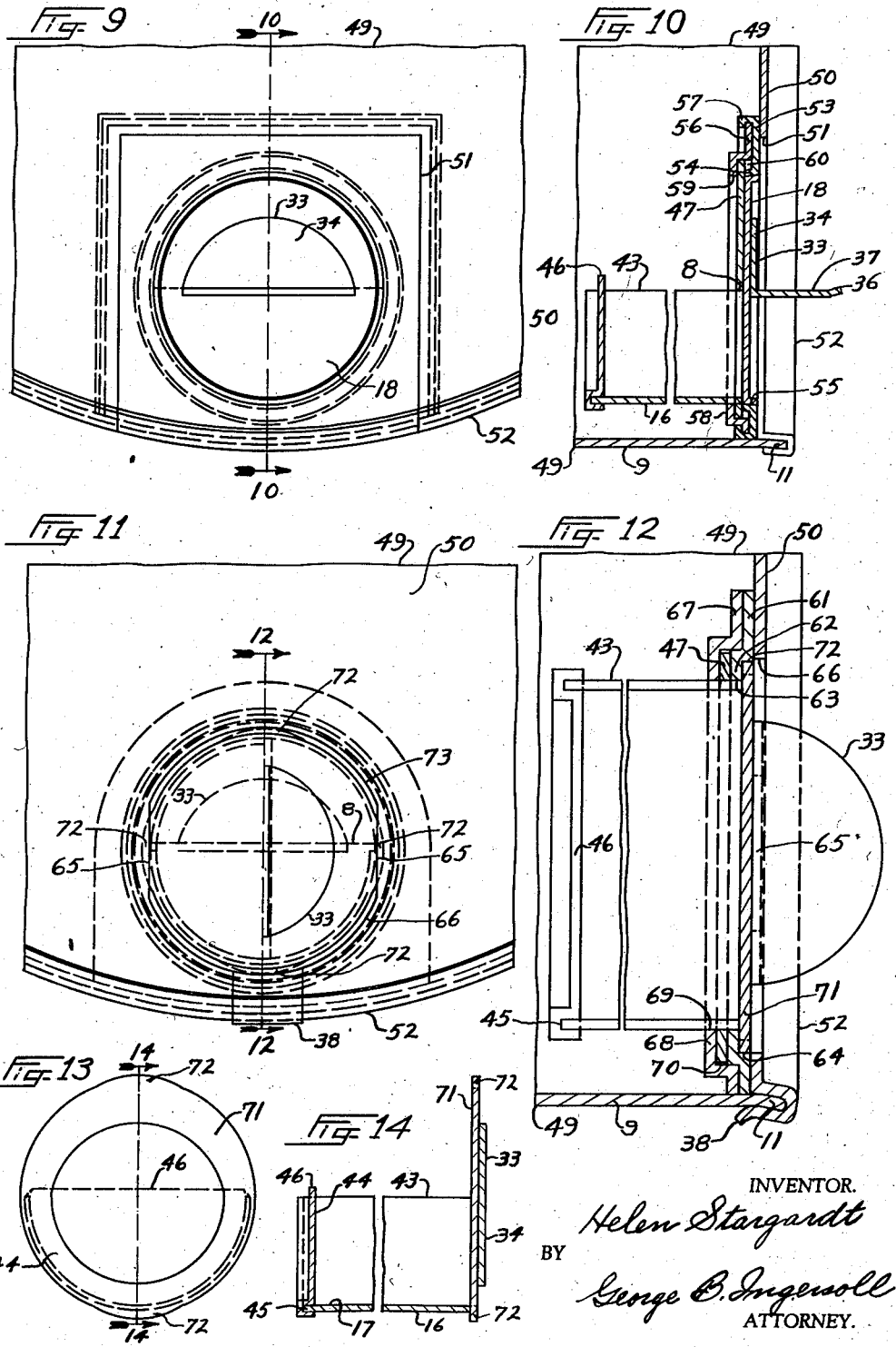

2,087,929

UNITED STATES PATENT OFFICE 2,087,929

CONTAINER AND MEASURING DEVICE THEREFOR

Helen Stargardt, Detroit, Mich.

Application December 19, 1935, Serial No. 55,223

15 Claims. (Cl. 221—104)

My invention relates to improvements in containers together with a device for measuring the contents of the container, and the objects of my invention are first, to provide a container hermetically sealed and having a measuring device therein; second, to provide a container having a measuring device together with means for sealing the can over the measuring device; third, to provide a container together with a measuring device therein with means whereby the measuring device may be sealed within the container, the sealing means being readily removable to uncover the measuring device therein; fourth, to provide a measuring device for a container, the measuring device having a movably mounted end wall to permit the measuring device to be inserted or pushed through the contents of the container with a minimum of resistance imposed thereon by the contents of the container; fifth, to provide a measuring device for a container and having a retainer wall pivotally mounted to move from its retaining position to a position in which it will not impede the movement of the measuring device when inserted into and through the contents of the container; sixth, to provide a measuring device for a container and having a pivotally mounted retaining wall with means for operating the retaining wall to a retaining wall position when the measuring device is withdrawn from the container to an extended position in the measuring operation; seventh, to provide a measuring device having a collapsible handle or finger grip portion to permit the handle or finger grip portion to be positioned in a compact relationship with the measuring device and the container to facilitate sealing the container; eighth, to provide a measuring device for a container and provided with means whereby the measuring device may, by its weight, form an air tight sealing connection with the container; ninth, to provide a measuring mechanism for a container and provided with means whereby the measuring mechanism may be locked under pressure to form a sealing connection with the container.

I attain these objects by the mechanism illustrated in the accompanying drawings, in which:—

Figure 1 is a side view of my container together with the measuring device assembled therewith; Fig. 2, a plan view of the container and measuring device as disclosed in Fig. 1; Fig. 3, a side view of the container disclosed in Fig. 1 and Fig. 2 together with the measuring mechanism being disclosed as having been withdrawn out of the container to a measuring position and in which the measuring device has been rotated to an upside down position for measuring or pouring the measured contents therefrom into a receptacle; Fig. 4, a partial plan view of the container and measuring device drawn to an enlarged scale over that of Fig. 2 to more fully disclose the measuring device after the sealing means of the container has been removed; Fig. 5, a partial sectional view of the container and its measuring mechanism taken on the line 5—5, Fig. 4, said partial sectional view disclosing the container member of the measuring mechanism partially in dotted lines to more clearly disclose the support means therefor; Fig. 6, a sectional view of the container member of the measuring mechanism disclosed as being removed from the container, said container member being provided with a movably mounted retaining wall portion at its inner end, said sectional view being taken on the line 6—6, Fig. 7; Fig. 7 a combined end and sectional view of the container member disclosed in Figs. 6 and 8, said sectional portion being taken on the line 7—7, Fig. 8; Fig. 8, a side view of the container member of the measuring mechanism disclosed in Figs. 6 and 7; Fig. 9, a partial plan view of the container together with a measuring mechanism being provided and assembled therewith, said measuring mechanism being provided with means for locking it in a sealing position and in connection with and for sealing the container after the container has been opened to permit use of the measuring mechanism; Fig. 10, a partial sectional view of the container and the measuring mechanism disclosed in Fig. 9 and taken on the line 10—10; Fig. 11, a partial plan view of the container together with the measuring mechanism, disclosed in Fig. 9, in its locked position relative to the container; Fig. 12, a partial sectional view of the container of the measuring mechanism disclosed in Fig. 11, said partial sectional view being taken on the line 12—12, Fig. 11; Fig. 13, an end view of the container member of the measuring mechanism disclosed in Figs. 9, 10 and 11; Fig. 14, a sectional view of the container member disclosed in Fig. 13, said sectional view being taken on the line 14—14, Fig. 13; and Fig. 15, a partial sectional view disclosing a portion of the flange construction of the washer member for supporting the container member of the measuring mechanism.

Similar numerals refer to similar parts throughout the several views.

The measuring mechanism disclosed in this present application is similar to that disclosed in my application for U. S. Letters Patent for Measuring device for containers, Serial No. 40,219, filed September 12, 1935, this present application, however, disclosing further improvements in the measuring mechanism together with means for supporting same, as well as disclosing means for sealing the container with the measuring mechanism therein.

The container 1 is provided with an opening 2 preferably located in one of the end walls 3 of the container 1, the opening 2 being formed by removing a portion 35 of the end wall 3, as hereinafter more fully disclosed, the disc or washer 4A being secured to the end wall 3 and provided with the flange 4 extending circumferentially around the opening 2A, the flange portion 4 together with the end wall 3 thus providing the groove 5 extending circumferentially around the opening 2A and engaging the flange portion 6 of the washer or disc member 7, the washer member 7 being provided with the semi-cylindrical opening 8 extending therethrough.

It is to be noted that the flange portion 6 of the washer member 7 will be initially formed with the flange portion 6 extending substantially at right angles with the main wall portion of the washer member 6 as indicated by the dotted lines 6A in Fig. 15 which will permit the flange portion 6 to be assembled relative to the groove 5 by displacing the flange portion 6 from the position indicated by the dotted lines 6A in Fig. 15 to its position of engagement with the groove 5 as indicated by the full lines in Fig. 15, this displacement of the flange portion 6 being accomplished by a spinning or similar operation.

The container 1 is disclosed as being provided with the side wall 9 which extends circumferentially around the end wall 3 and the end wall 10, the side wall 9 being provided with the flange portion 11 which may be positioned angularly relative to the main wall portion of the side wall 9 for engagement with the flange portion 12 of the end walls 3 or 10, the flange portion 12 being folded around the flange portion 11 as at 13 by a spinning or similar operation to effectually seal the interior of the container 1.

My measuring mechanism herewith disclosed is mounted in a cylindrical container although it is to be understood that any shape or size of container may be used to embody my invention.

The end walls 3 and 10 may be provided with the indented portion 14 or similar formation to reinforce the end walls 3 and 10 to prevent buckling or displacement of same.

The opening 2 is preferably located as disclosed in Figs. 1, 4 and 5 adjacent the inside surface of the side wall 9 to facilitate the operation of my measuring mechanism therein as disclosed by its position in Fig. 3.

It is to be noted that the semi-cylindrical opening 8 in the washer member 7 will be located in alignment with the opening 2 of the end wall 3 and will provide a bearing for the container 16 of the measuring mechanism, the container 16 having a semi-cylindrical shape to conform to the semi-cylindrical opening 8 and the cylindrical opening 2, to permit the container 16 to slidably move therewith.

The container 16 of the measuring mechanism may be provided with a plurality of compartments of the desired size as disclosed in my above mentioned pending application, or it may be utilized with a single compartment 17 as disclosed herein, said compartment 17 being sufficient in size to correspond to the cubic contents of a teaspoon or tablespoon or similar measuring member as used in households in cooking and measuring operations.

The container 16 is provided with the end wall 18 which is cylindrical in shape and which is provided with the flange portion 19 which extends circumferentially therearound, on its outer side, the tapered or inclined surface 20 being adapted to engage and fit with the opening 2A of the disc 4A as indicated by the dotted lines 21 in Fig. 5 to seal the interior of the container 1 when the measuring mechanism is not being used in measuring operations.

The compartment 17 is open at its upper side in its position as disclosed in Figs. 6, 7, and 8, the bottom side walls of the compartment 17 being formed by the semi-cylindrical member 22 which has its end edge portion displaced to form the flange portion 23 and which is positioned at an angle relative to the main wall portion of the member 22 for engagement with the flange portion 24 of the end wall 18, the flange portion 24 being folded around the flange portion 23 of the member 22 throughout its semi-cylindrical length and then the flange portion 24 is formed in tight engagement with the adjacent flange portion 19 for the remaining cylindrical portion of the end wall 19 as disclosed at 25 in Fig. 8, the member 22 and the end wall 18 being made of relatively thin stock permitting the assembly of the end wall 18 and the member 22 as above described with substantially a continuous tapered surface 20 which will permit effectual sealing when engaging with the surfaces of the opening 2 as indicated by the dotted lines 21 of Fig. 5.

The compartment 17 is closed at its other end by the wall member 26 which is provided with the extension portions 27 on each of its sides extending through suitable openings in the wall portions of the member 22, the extension portions 27 being displaced or bent as at 28 to form arm or lever members for moving the wall member 26 from its position as indicated by the full lines in Fig. 7, in which it forms an end wall for the compartment 17, to the position indicated by the dotted lines 29 in Fig. 8, and the full lines as disclosed in Fig. 6, this movement of the wall portion 26 being accomplished when the arm or lever portions 28 engage the washer member 7 when the container 16 has been slidably moved through the semi-cylindrical opening 8 and the full opening 2 to the position indicated in Fig. 3 which corresponds to the extended position of the measuring mechanism when being used in its measuring operation.

It is to be noted that Fig. 3 discloses the container 1 as having been positioned with its end walls 3 and 10 in substantially vertical planes which thus positions the measuring mechanism where it may be readily withdrawn to its extended position above a cup or similar receptacle 30 for receiving the measured contents 31 from the container 16 after the container 16 has been slidably moved outwardly relative to the container 1 and revolved so that its open side is on the bottom to permit the measured contents thereof to be poured or dropped into the cup or similar receptacle 30. It is to be noted that the wall member 26 will be automatically positioned, as indicated by the dotted lines 26, by the weight and contact of the contents within the container 16 to form an end wall of the compartment 17, the wall member 26 being held by the weight and contact of the contents of the container 22 in engagement with the lug or boss 32 which may be formed by upsetting the stock of the semi-cylindrical wall portion of the container 22, the wall portion 26 thus being pivotally mounted to permit its automatic movement from the position indicated by the dotted lines 26 to the position indicated by the dotted lines 29 in Fig. 8, when the container 22 is moved from its maximum outward position, as indicated in Fig. 3, to its maximum inward position in which the tapered surface 20 will engage the opening 2A as indicated by the dotted lines 21 in Fig. 5, the wall portion 26 thus being further adapted to be moved by the pressure of the contents of the container 1 from the position, indicated by the dotted lines 26 in Fig. 8, to the position as indicated by the dotted lines 29 in Fig. 8, to permit the measuring mechanism to be readily inserted into the container 1 and through the contents thereof, and to eliminate excessive thrusts against the wall portion 26 which would otherwise be the case if the wall portion 26 was rigidly fixed for forming an end wall of the compartment 17.

It is to be noted that the end wall portions of the container 16 will be formed to provide the stop lugs or flanges 16A for engaging and limiting further movement of the wall portion 26 after it reaches the position indicated by the dotted lines 29, Fig. 8, and the full lines in Fig. 6.

The handle or finger hold member 33 is suitably connected as by soldering or similar means throughout its lower portion 34 to the end wall 18, the handle member 33 being assembled initially as disclosed by the dotted lines in Fig. 8 so that its upper portion will be positioned adjacent the outer surface of the end wall 18, to permit the handle member 33 to be assembled within the maximum width or thickness of the wall portion 18 together with the flange portion 19, thus permitting the sealing cover or tab 35 to extend over and close the outer end of the sealing mechanism after the container 1 has been filled with its contents for shipment.

The handle member 33 will be provided with the flange portion 36 at its upper end and extending at an angle with the main wall portion of the handle member 33 to permit its upper edge portion to be positioned away from the main wall portion of the end wall 18 so that the operator may insert his finger above the flange portion 32 and fold the upper portion of the handle member 33 to the position indicated by the full lines 37 in Fig. 8, the handle member 33 thus being displaced to form a portion extending substantially at right angles to the wall member 18 when the handle member 33 is being utilized to slidably move the container 16 through the semi-cylindrical opening 8 and the opening 2A in its measuring movement and at the same time permitting the handle member 33 to be folded so that the measuring mechanism may be entirely closed by the sealing cover 35 to permit the container 1 to be hermetically sealed for shipment and until such time as the container 1 is delivered to the purchaser.

When the purchaser is ready to measure the contents of the container 1, the sealing cover or tab 35 is readily removed by grasping the handle or finger hold portion 38 which extends around the edge of the container 1 and through a suitable notch or groove portion 39 formed in one of the flange portions 23, the sealing cover or tab 35 initially forming an integral portion of the end wall 3 of the container 1, the sealing cover or tab 35 being scored around its periphery so that it can be readily separated from the remaining wall portion of the end wall 3 by means of a conventional key member 40 which is provided with the handle portion 41, together with a conventional loop portion 41A through which is inserted the handle member 38, thus readily permitting the key member 40 to be connected with the handle portion 38 and then by a revolving motion the sealing cover or tab 35 may be rolled up as disclosed in Fig. 2 to sever the sealing cover or tab 35 from the remaining wall portion of the end wall 3 and to uncover the measuring mechanism, the key member 40 being disclosed in Fig. 2 as having been operated through a portion of its revolving motion and to disclose the sealing member or tab 35 as having been partially removed, leaving the opening 2 in the end wall 3 of the container 1, thus uncovering the handle member 33 and permitting the measuring mechanism to be readily operable for measuring the contents of the container 1.

It is to here be noted that my container and measuring mechanism is especially applicable for the shipment of such foods as coffee, or similar products, where it is desirable to retain the flavor of the product free from evaporation or similar weakening processes until such time as the product is ready for use in the kitchen or culinary department of a household or similar establishment.

Figs. 13 and 14 disclose the container 43 which is similar to the container 22 and is provided with the semi-cylindrical member 16 which provides wall portions for the compartment 17, the compartment 17, however, being provided with a fixed end wall 44, instead of the pivotally mounted wall portion 26, the fixed end wall 44 being provided with its outer peripheral edge formed to enclose the end edge portion of the member 16, as disclosed at 45, the flange portions of the fixed end wall 44 being suitably secured to the member 16 as by soldering or similar means.

It is to be noted that the fixed end wall 44 will be extended at 46 to a position slightly above the straight edge portion of the cylindrical opening 8 of the washer or disc member 47, disclosed in Figs. 10 and 12, to provide means for preventing the container 43 from being operably moved out of the container 1 in which the measuring mechanism is installed, the portion 46 being extended sufficiently only to provide said retention means for the container 43 and to allow the container 43 to be slightly tilted longitudinally to enable the portion 46 to be entered through the semi-cylindrical opening 8 in the washer member 47.

Also it is to be noted that the washer member 47, together with its supporting mechanism, will be made of relatively light material which will allow for a slight distortion so that the container member 43 can be entered therethrough and after its entrance therein the portion 46 will be positioned above the lower edge of the semi-cylindrical opening 8, thus providing means for retaining the containers 43 from movement entirely out of the container 1.

In a similar way the wall portion 26, as disclosed in Figs. 6, 7 and 8, may be extended as at 48 to retain the container 22 from being moved entirely out of the container 1 in which it is installed, the container 22 being further retained by the extension portions 27 engaging the disc or washer 7 at the end of its outward movement.

The container 49 as disclosed in Figs. 9, 10, 11 and 12 is similar to the container 1, the container 49 having one of its end walls 50 provided with the opening 51 therethrough, the opening 51 having substantially a rectangular shape, the opening 51, Figs. 9 and 10, being formed similarly to the opening 2 of the container 1, Figs. 2 and 4, by the removal of a sealing cover or tab which forms a portion of the wall portion 50 of the container 49.

The disc or washer 53, as disclosed in Fig. 10, is suitably secured to the inside surface of the wall portion 50 of the container 49, the inner edge of the disc 53 being displaced to form the flange portion 54 forming a tapered opening therethrough for engaging the tapered or inclined surface 55 of the end wall 18 of the container member 43.

The disc member 56 is suitably secured to the disc member 53 as by soldering, welding or similar means, and may have its outer edge secured by displacing the peripheral edge of the disc member 53 to form a flange portion 57 for overlapping the periphery of the disc member 56 to further retain the disc member 56 in its assembly with the disc member 57 and to eliminate the soldering or welding operation if desired.

The disc member 56 is displaced to form the flange portion 58 extending peripherally therearound and is provided with the cylindrical opening 59 therethrough.

It is to be noted that the assembly of the disc members 56 and 53 will form the annular chamber 60 which provides a bearing for rotatably supporting the disc member 47, the disc member 47 being retained axially between the flange portion 58 and the inner edge surface of the flange portion 54 of the disc member 53.

One of the handle members 33 is suitably secured to the wall member 18 of the container 43 in a manner similar to that disclosed relative to the construction of Figs. 7 and 8, the handle member 33 being disclosed in a reversed position from that disclosed in Fig. 8.

It is to be noted that the container member 43, as disclosed in Figs. 9 and 10, may be sealed in the container 49 by a sealing cover or tab similar to that disclosed at 35 in Fig. 2, said sealing cover forming the opening 51 after removal.

Also it is to be noted that when it is desired to provide means for locking the containers of the measuring mechanisms in their assembled positions relative to the containers in which the measuring mechanisms are used and when the containers are being stored between the times when it is necessary to utilize the measuring mechanism, I provide a disc member 61, as disclosed in Fig. 12, and which may be suitably secured to the inside surface of the wall portion 50 of the container 49, the disc member 61 being provided with the offset flange portion 62 having the cylindrical opening 63 therethrough for receiving the container 43.

It is also to be noted that the offsetting of the flange portion 62 relative to the main wall portion of the disc 61 will provide the cylindrical recess 64 which will be overhung or overlapped by the portions 65 of the sides of the opening 66, the opening 66 being disclosed in Figs. 11 and 12 as being cylindrical in shape instead of rectangular as disclosed in Fig. 9, the opening 66 being formed by the removal of a sealing cover or tab having a cylindrical shape and provided with a portion 38, Figs. 11 and 12, which is similar to the portion 38 disclosed in Fig. 1.

The disc member 67 is suitably secured to the disc member 61, as by soldering or similar means, and is provided with the offset wall portion 68 having the opening 69 therethrough for receiving the container 43, the offset wall portion 68 relative to the flange portion 62 providing the annular chamber 70 in which is rotatably mounted a disc member 47.

The container 43 is provided with the end wall 71 having oppositely disposed extension portions 72 which thus extend beyond the normal diameter of the main cylindrical portion of the end wall 71 and are adapted to extend under and in engagement with the portions 65 of the opening 66 of the end wall 50.

It is thus to be noted that when the container 43 is inserted through the cylindrical openings of the disc members 61 and 67, and through the semi-cylindrical opening of the disc member 47, the container 43, together with the washer 47 may be rotated from a position indicated by the handle member 33 in dotted lines in Fig. 11 to the position indicated by the full lines of the handle member 33, the dotted lines indicating the container 43 as being in position for a slidable movement longitudinally relative to the washer or disc member 47, the full lines of the handle member 33 in Fig. 11 indicating that the container 43 has been rotated or revolved substantially through an arc of 180° to cause the extension portions 72 of the end wall 71 of the container 43 to be moved under and in engagement with the portions 65 of the opening 66 of the end wall 50 of the container 49, thus locking the container 43 in its assembled position in the container 49 when the measuring mechanism is not being used, and providing a positive means for insuring a sealing pressure between the measuring mechanism and the container 49, the portions 72 of the end wall of the container 43 being made of sufficient thickness so that they will crowd under the portions 65 and tend to exert pressure to lock and seal the container 43 of the measuring mechanism within the container 49.

The handle member 33 is disclosed in Fig. 14 in its normal position before it has been displaced outwardly to provide finger hold means for operating the container 43.

The handle member 33 in Figs. 11 and 12 is disclosed as having been bent outwardly through substantially one half of its area in a manner similar to the construction disclosed in Fig. 8.

In operation, the containers 1 and 49 will be hermetically sealed with contents such as coffee or similar foods therein, together with the measuring mechanism assembled therein, and with the handle portion 33 in its initial position in which it lies substantially parallel with the end wall 3 or 50, the end wall 3 or 50 being scored or perforated sufficiently as indicated by the opening 2 in Fig. 2, the opening 51 in Fig. 9, or the opening 66 in Fig. 11, to provide removal tabs to hermetically seal the measuring mechanism and to insure that the contents will be enclosed within air tight containers 1 and 49.

After the containers have been shipped, together with their products therein, to the ultimate consumer, the housewife, chef, or similar operators will utilize the conventional key member 40 which may be individually provided with each of the containers, a loop end 41A of the key member 40 being placed around the portion 38, the portion 38 then being wound by revolving the key member 40 so that the sealing cover or tab 35, as disclosed in Fig. 2, or the similar sealing covers or tabs in the other figures, may be separated from the remaining wall portions of the end walls of the containers 1 and 49.

This exposes the handle member 33, which can be gripped at the finger hold portion 36 and bent outwardly substantially at right angles to the axis of the measuring mechanisms, the containers of the measuring mechanism being initially assembled within the containers 1 and 49 through an open side through which the coffee or similar food products are packed in the containers 1 and 49.

Then the containers of the measuring mechanisms may be filled by tilting the containers 1 and 49 in a manner disclosed in Fig. 3, then by gripping the handle member 33, the operator may slidably move the containers of the measuring mechanism longitudinally until the inner end wall portions of the containers engage the washer member 7 or 47, thus limiting the outward movement of the measuring mechanisms.

Then the measuring mechanisms may be rotated by means of the handle member 33 through substantially an arc or angle of 180° which will bring the open side of the containers of the measuring mechanisms downwardly toward the cup or receptacle 30 for receiving the contents which have been measured, the measured contents dropping out of the measuring mechanism by their own weight.

The containers of the measuring mechanism may now be rotated back substantially through 180° rotation so that their open sides are uppermost.

Then the containers of the measuring mechanism may be slidably moved longitudinally into the container 1 or 49 again.

If the wall portion 26 is utilized in the container of the measuring mechanism, the inward thrust of the measuring mechanism will cause the wall member 26 to pivotally move from its position, as indicated at 26 in Fig. 8, to the position indicated by the dotted lines 29 in Fig. 8, thus eliminating substantially all end thrust pressure against the movement of the measuring mechanism into the container 1 or 49 due to the contents thereof pressing against the end of the containers of the measuring mechanisms.

If additional measured amounts are required then the operation may be repeated as above described.

After the first mentioned operation has deposited the required amount of the food products in the cup or receptacle 30, then the container 1 or 49 may be stored back on the shelves or similar supporting portions of the kitchen or pantry equipment, the containers 1 and 49 being positioned with the measuring mechanisms upright, as disclosed in Fig. 1 so that the weight of the measuring mechanism will tend to maintain the tapered surface 20 in contact with the surfaces of the disc member 4A forming the openings 2A, Fig. 5, thus maintaining substantially an air tight closure when the measuring mechanism is not being used.

In a similar way the tapered surface 20 of the container 43 will be maintained by the force of gravity of the measuring mechanism in contact with the tapered surface 55 of the flange portion 54 of the measuring mechanism disclosed in Figs. 9 and 10 to seal the container 49 when the measuring mechanism is not being used.

When the measuring mechanism, as disclosed in Figs. 11, 12, 13 and 14 is used, then the measuring mechanism is rotated through substantially 180° after it has been inserted into the container 49 to bring the extension portions 12 under the portions 65 of the opening 66, thus tending to maintain the measuring mechanism in assembly and under compression to further maintain the sealing of the container 49 when the measuring mechanism is not being used and after the sealing cover or tab has been removed from the container 49 preparatory for the measuring operation.

I claim:

1. In a container provided with a measuring device, the combination of a wall portion of the container provided with an opening therethrough together with a disc member having a flange forming a groove extending circumferentially around said opening, a second disc member provided with a flange rotatably mounted in said groove, said disc member being provided with a semi-cylindrical opening therethrough, a measuring container slidably mounted in the semi-cylindrical opening of said second disc member and provided with an end wall adapted to engage said disc member to limit the outward movement of said measuring container, said measuring container being provided with an end wall having a tapered surface adapted to engage said opening of said first mentioned disc member to limit the inward movement of said measuring container, said measuring container being provided with a handle member normally extending substantially at right angles to the axis of said measuring container, said handle member being adapted to be partially displaced to extend substantially parallel with the axis of said measuring container, a sealing cover extending over said measuring container and forming a part of said wall portion of said first mentioned container, and means for severing said sealing cover from its remaining wall portion to uncover said measuring container and to form said opening in said wall portion of said first mentioned container.

2. The combination of a container having a side wall, a support means secured to said side wall, a disc rotatably supported by said support means, and a measuring member movably supported in said disc and extending within said container.

3. The combination of a container having a side wall, a support means secured to said side wall, a disc rotatably supported by said support means, and a measuring member movably supported in said disc and extending within said container, and means for sealing said measuring member in said container, said means forming a portion of one of the walls of said container.

4. The combination of a container for food products and provided with a wall portion having an opening therethrough, and a measuring member movably supported on said wall portion and extending through said opening and within said container, said measuring member being provided with an end wall pivotally mounted and adapted to move from a position in which it acts as an end wall to a position in which it will exert a lesser amount of resistance to the movement of said measuring member within and through the food products in said container.

5. The combination of a container for food products and provided with a wall portion having an opening therethrough, and a measuring member movably supported on said wall portion and extending through said opening and within said container, said measuring member being provided with an end wall pivotally mounted and adapted to move from a position in which it acts as an end wall to a position in which it will exert a lesser amount of resistance to the movement of said measuring member within and through the food products in said container; and means for hermetically sealing said measuring member together with said food products in said container.

6. The combination of a container for food products and provided with a wall portion having an opening therethrough, a disc member rotatably supported by said wall portion and provided with an opening therethrough, and a measuring member movably supported in said disc member and extending through said opening of said wall portion and said disc member, said measuring member extending within and through the food products in said container when in an inmost position, said measuring member extending outwardly relative to said container when in an outmost position, said measuring member being provided with a wall portion movably mounted at its inner end portion and adapted to be actuated from a position in which it acts as a retaining wall to a position in which it will exert a lesser amount of resistance from contact with said food products when said measuring member is moved into said container, said wall portion being provided with arm members adapted to engage said disc member, when said measuring member is moved to its outmost position relative to said container, for actuating said wall portion to said first mentioned position in which it acts as a retaining wall of said measuring member.

7. The combination of a container for food products and provided with a wall portion having an opening therethrough, a disc member rotatably supported by said wall portion and provided with an opening therethrough, and a measuring member movably supported in said disc member and extending through said opening of said wall portion and said disc member, said measuring member extending within and through the food products in said container when in an inmost position, said measuring member extending outwardly relative to said container when in its outmost position, said measuring member being provided with a wall portion movably mounted at its inner end portion and adapted to be actuated from a position in which its acts as a retaining wall to a position in which it will exert a lesser amount of resistance from contact with said food products when said measuring member is moved into said container, said wall portion being provided with arm members adapted to engage said disc member, when said measuring member is moved to its outmost position relative to said container, for actuating said wall portion to said first mentioned position in which it acts as a retaining wall of said measuring member, and means for hermetically sealing said measuring member together with said food products in said container.

8. The combination of a container for food products and provided with a wall portion having an opening therethrough, a disc member rotatably supported by said wall portion, and a measuring member movably supported in and relative to said disc member, said measuring member extending through said opening of said container and through said disc member, said measuring member being provided with an end wall together with a handle member positioned normally adjacent said end wall, said handle member being adapted to have a portion of itself displaced from its position adjacent said end wall to a position extending substantially at right angles thereto to facilitate its being gripped by the hand of the operator.

9. The combination of a container for food products and provided with a wall portion having an opening therethrough, a disc member rotatably supported by said wall portion, and a measuring member movably supported in and relative to said disc member, said measuring member extending through said opening of said container and through said disc member, said measuring member being provided with an end wall together with a handle member positioned normally adjacent said end wall, said handle member being adapted to have a portion of itself displaced from its position adjacent said end wall to a position extending substantially at right angles thereto to facilitate its being gripped by the hand of the operator, and means for hermetically sealing said measuring member together with said food products in said container, said means covering said handle member in its normal position adjacent said end wall of said measuring member.

10. The combination of a container for food products and provided with a wall portion having an opening therethrough, said wall portion being provided with extension portions oppositely disposed about said opening, a disc member rotatably supported by and on the inside of said wall portion, and a measuring member movably supported in and relative to said disc member and provided with an end wall having oppositely disposed extension portions adapted for engagement with said extension portions of said side wall to lock said measuring member against movement, said measuring member being locked with pressure to seal said measuring member together with said food products in said container.

11. The combination of a container for food products and provided with a wall portion having an opening therethrough, said wall portion being provided with extension portions oppositely disposed about said opening, a disc member rotatably supported by and on the inside of said wall portion, and a measuring member movably supported in and relative to said disc member and provided with an end wall having oppositely disposed extension portions adapted for engagement with said extension portions of said side wall to lock said measuring member against movement, said measuring member being locked with pressure to seal said measuring member together with said food products in said container, and means for further hermetically sealing said measuring member together with said food products in said container.

12. The combination of a container for food products and provided with a wall portion having an opening therethrough, said wall portion being provided with extension portions oppositely disposed about said opening, a disc member secured to and supported on the inside of said wall portion, said disc member being provided with a recess in alignment with and adjacent said opening of said wall portion, a second disc member secured to said first mentioned disc member and forming an annular recess therebetween, a third disc member rotatably mounted in said annular recess and provided with a semi-cylindrical opening therethrough, and a measuring member having a semi-cylindrical portion mounted in said semi-cylindrical opening of said third disc member and axially movable relative thereto, said measuring member being provided with a wall portion having oppositely disposed extension portions adapted for engagement with said extension portions of said wall portion of the container to lock said measuring member against movement, said measuring member being locked with pressure to seal said measuring member together with said food products in said container, said wall portion of said measuring member being located in said recess of said first mentioned disc member when in its locked position.

13. The combination of a container for food products and provided with a wall portion having an opening therethrough, said wall portion being provided with extension portions oppositely disposed about said opening, a disc member secured to and supported on the inside of said wall portion, said disc member being provided with a recess in alignment with and adjacent said opening of said side wall, a second disc member secured to said first mentioned disc member and forming an annular recess therebetween, a third disc member rotatably mounted in said annular recess and provided with a semi-cylindrical opening therethrough, and a measuring member having a semi-cylindrical portion mounted in said semi-cylindrical opening of said third disc member and axially movable relative thereto, said measuring member being provided with a wall portion having oppositely disposed extension portions adapted for engagement with said extension portions of said wall portion of the container to lock said measuring member against movement, said measuring member being locked with pressure to seal said measuring member together with said food products in said container, said wall portion of said measuring member being located in said recess of said first mentioned disc member when in its locked position, and means for further hermetically sealing said measuring member together with said food products in said container.

14. The combination of a container for food products and provided with a wall portion having an opening therethrough, a disc member rotatably supported by said wall portion and provided with a semi-cylindrical opening therethrough, and a measuring member mounted in said semi-cylindrical opening of said disc member and axially movable relative thereto, said measuring member being provided with an end wall adapted to engage said disc member to limit movement of said measuring member in one direction.

15. The combination of a container for food products and provided with a wall portion having an opening therethrough, a disc member rotatably supported by said wall portion and provided with a semi-cylindrical opening therethrough, and a measuring member mounted in said semi-cylindrical opening of said disc member and axially movable relative thereto, said measuring member being provided with an end wall adapted to engage said disc member to limit movement of said measuring member in one direction, and means for further hermetically sealing said measuring member together with said food products in said container.

HELEN STARGARDT.